United States Patent [19]

Mosher et al.

[11] Patent Number: 4,535,856

[45] Date of Patent: Aug. 20, 1985

[54] COMBINATION WEIGHING MACHINE HAVING SHORT SEARCH

[75] Inventors: Oren A. Mosher, Hayward; Ellwood S. Douglas, Orinda, both of Calif.

[73] Assignee: Package Machinery Co., East Longmeadow, Mass.

[21] Appl. No.: 580,847

[22] Filed: Feb. 16, 1984

[51] Int. Cl.³ .................... G01G 19/00; G01G 19/22; G01G 19/52

[52] U.S. Cl. ........................................ 177/1; 177/25; 177/50; 364/567

[58] Field of Search .............. 177/1, 25, 50, DIG. 12; 364/567

[56] References Cited

U.S. PATENT DOCUMENTS 4,396,078 8/1983 Minamida et al. ............... 177/1
4,416,341 11/1983 Hirano ............................. 177/1
4,466,500 8/1984 Mosher et al. .................... 177/1

*Primary Examiner*—E. A. Goldberg
*Assistant Examiner*—Patrick W. Foster
*Attorney, Agent, or Firm*—McCormick, Paulding & Huber

[57] ABSTRACT

A combination weighing machine for forming a charge of product closely approximating a target amount includes a plurality of weigh scales, each of which receives a quantity of product and produces a signal proportional to the quantity of product received. The quantities are combined according to a combination searching sequence in a search operation, and a combination of scales which closely approximates a target amount is dumped to form the desired charge. The dumped scales are reloaded, and the process is repeated in a cyclic manner. The speed of the cyclic process is improved without significantly sacrificing accuracy by allocating less time than necessary for a complete search of all possible combinations in the search sequence. A search is terminated when the time expires, whether the search sequence is completed or not.

18 Claims, 5 Drawing Figures

| BEST COMB. TABLE | | | | | |
|---|---|---|---|---|---|
| ADDRESS | VALUE | | TOTAL SCALES | NEW SCALES | COMB. |
| 1 | WT | 1 | 4 | 2 | 1,3,7,8 |
| 2 | WT | 2 | 3 | 2 | 1,3,10 |
| 3 | WT | 3 | 6 | 4 | 1,2,5,12,13,14 |
| 4 | WT | 4 | 7 | 3 | 1,2,3,6,7,8,10 |
FIG. 3
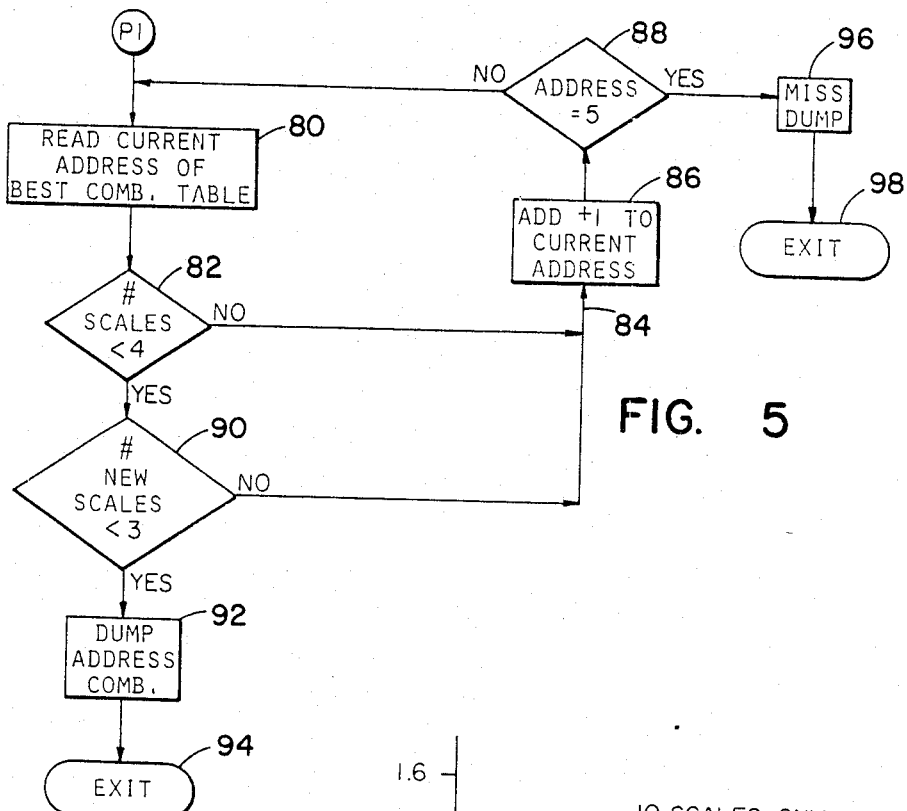
FIG. 5
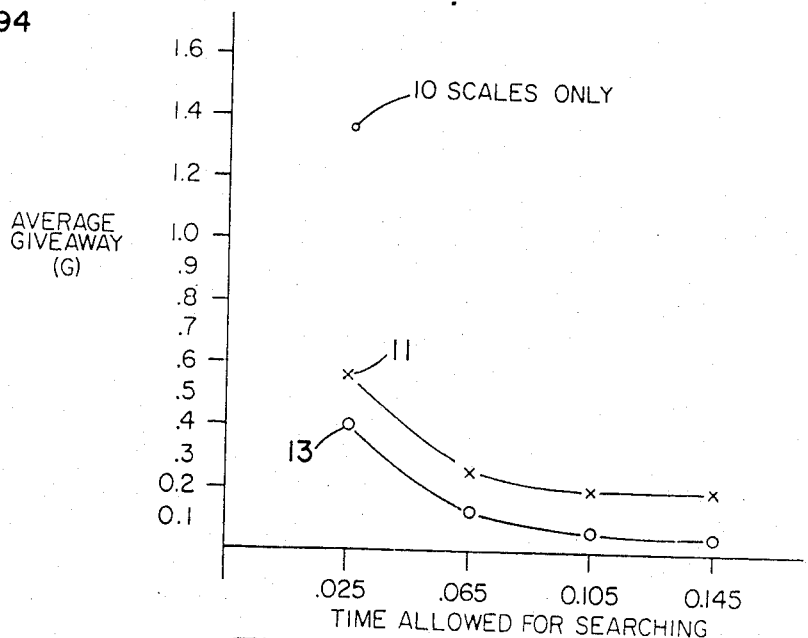
FIG. 4

COMBINATION WEIGHING MACHINE HAVING SHORT SEARCH

BACKGROUND OF THE INVENTION

The present invention relates to combination weighing and is concerned in particular with an improvement in a combination weighing machine to increase the production rate without significantly sacrificing accuracy.

In a combination weighing machine, a plurality of weigh scales are loaded with a product in an amount that is generally a fraction of a target amount. The target amount may be either a total weight or a total number of articles obtained by dividing the scale weights by a unit weight factor. A search of the scales is made to select that combination which most closely approximates but is not less than the target amount. The scales which are members of the selected combination are then dumped to form a single charge of product which is delivered to an associated packaging machine or utilized in some similar manner.

Each cycle of operation in a combination weighing machine includes several sequential steps. The major steps are listed here together with typical elapsed time requirements for a 10-scale machine in the present state of the art.

| (1) | Deliver a new quantity of product to each empty scale | .200 secs. |
|---|---|---|
| (2) | Allow newly loaded scales to settle | .470 secs. |
| (3) | Read and process the weight of product in each scale | .080 secs. |
| (4) | Conduct the combination search operation | .050 secs. |
| (5) | Dump scales of best combination | .200 secs. |
| | TOTAL | 1.000 secs. |

Packaging machines are typically required to form in each package a charge of product that is not less than a labeled weight. As a result, packaging machines are typically set to deliver charges of product that are slightly above the labeled weight, or target amount, in order to avoid any packaging violations. Therefore, each package may contain excess product that is traditionally called "give-away". For package weights of a few hundred grams, give-aways may be in the order of several grams, but state-of-the-art combination weighers have managed to reduce the give-away to one gram or less.

The give-away quantities in combination weighing machines stem from three major sources.

(1) Errors in the measured weights,
(2) Statistical improbability of the best combination being exactly equal to the target amount,
(3) Failure to deliver the full measured amount from a scale (scale adherence).

The present invention is concerned with item 2 above.

For efficient operation, a combination weighing machine must deliver charges of product with low give-away at high production speeds or rates. From a practical point of view, these two goals are in conflict. The component of give-away due to the statistical improbability mentioned in item 2 above, is reduced by a factor of 2 when another scale is added in the combination search, but the time required to complete a full search with the added scale is increased by a factor of 2. This result stems from the fact that the total number of combinations to be searched is $2^n - 1$, where "n" is the number of scales.

As indicated in our co-pending application, Ser. No. 430,354, filed Sept. 30, 1982, a full search of all combinations is not essential to arrive at the combination of weigh scales which most closely approximate the target amount. For example, combinations which include subcombinations equal to or greater than the target amount will not constitute improvements over the subcombinations themselves, and therefore, certain steps in a search sequence which builds upon subcombinations can be skipped or omitted in the search operation. Since the number of steps which can be skipped in any given cycle depends upon the weights of product in the scales, the number of steps skipped varies from cycle to cycle, and the time required to complete a search operation is not predictable.

Since the time required to complete the search operation varies from one machine cycle to the next and is not predictable, combination weighing machines which are designed to always complete a combination search generally allot for every search a maximum time, that is, the time necessary for all combinations to be examined. Since most of the search operations can be completed in a substantially shorter period of time, machines which allot the maximum time waste some time in each cycle of operation while the alloted search time runs out.

In the combination weighing machine in our co-pending application Ser. No. 572,661 filed Jan. 20, 1984 and entitled "Combination Weighing Machine with Adaptive Signal Correction", only qualified scales are searched, and the number of qualified scales participating in search operation varies from one cycle to the next. Some scales are periodically withdrawn from operation for purposes of calibration. Other scales which were recently dumped may be in the process of reloading while a new search is conducted on the remaining scales. Still other scales may be inoperative. Each change of a participating scale also changes the required search time by a factor of two, as mentioned above. Thus, those machines which allot a maximum period of time to complete a full search operation waste a substantial portion of the search time.

In certain prior art combination weighing machines, the number of scales participating in the combination search was arbitrarily limited in order to reduce the search time. At the same time, search time was being wasted because the time allotted was based upon the maximum time needed to conduct a full search. It has been determined that the amount of give-away is improved (reduced) only insignificantly by conducting a full search as opposed to cutting off the search in one-sixth of the allotted time. Furthermore, the amount of "give-away" is also improved by increasing the number of scales that participate in the search operation. Therefore, the overall performance of the combination weighing machine, taking into consideration accuracy and speed, can be improved by allotting less than the maximum period of time for the combination search and including as many scales as possible in the search. A limitation on the period of time to conduct a search results in some machine cycles in which the search operation is terminated before the complete search is performed, but this consequence can be made to be insignificant and in many cycles, the full search will be carried out in any event due to the skipping of certain combinations containing subcombinations exceeding the target amount and due to the fact that not all scales are prepared or qualified to participate in a search.

It is accordingly a general object of the present invention to provide a combination weighing machine and a method of operating that machine in which the combination search is terminated whether the search is completed or not, and the results of the partial search are then utilized to form a charge of product.

It is a further object of the present invention to select from the search results after termination of preferred combination on the basis of criteria that were not employed during the search itself.

SUMMARY OF THE INVENTION

The present invention resides in a combination weighing machine for forming a charge of product closely approximating a target amount. The machine operates in a cyclic fashion and is comprised of a plurality of weigh scales, each of which receives a quantity of product in an amount that is preferably a fraction of the predetermined amount and provides a signal indicative of the quantity of product received.

Arithmetic means is provided for receiving the product signals from the scales in various combinations and combines the signals to produce sums indicative of the total quantity of product in each respective combination. The combinations are formed by a combination searching means which supplies the scale signals to the arithmetic means in a search sequence during each search operation.

In the course of a search operation, comparator means determines which of the combinations of scales have total sums most nearly approximating the target amount, and memory means are provided for storing the best of the searched combinations.

The machine also includes means for terminating the search operation of the combination searching means upon the occurrence of a specified condition, such as the receipt of a timing signal, whether the search sequence is completed or not. At that point, utilization means, such as the dump mechanism for the scales, receives from the memory means the preferred combination, and the scales are thereby dumped to form the charges of product closely approximating the target amount.

The invention also resides in the method by which the combination machine operates, particularly the termination of the search operation and the utilization of the search results, whether the search through the full sequence of scale combinations has been completed or not.

BRIEF DESCRIPTION OF THE DRAWINGS

FIG. 3 illustrates a best weight table in the memory of the combination weighing machine.

FIG. 4 is a diagram showing several graphs illustrating the effects of terminating a combination search prior to completion.

FIG. 5 is a flow chart illustrating the program for selecting one of several scale combinations after the search has been terminated.

DESCRIPTION OF THE PREFERRED EMBODIMENTS

Figure 1:
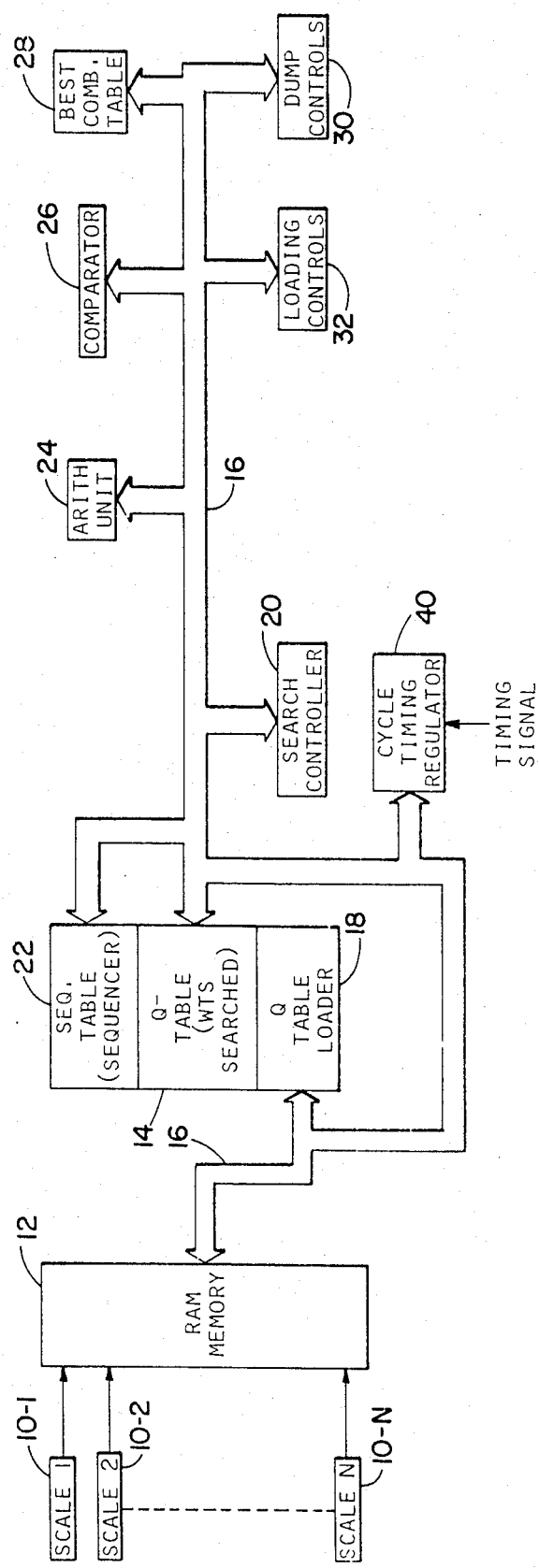
FIG. 1 is a block diagram illustrating the components in the combination weighing machine constructed in accordance with one embodiment of the present invention.

FIG. 1 illustrates the basic components in the controls of a combination weighing machine that incorporates the present invention and that is based upon a microprocessor design. The machine includes a plurality of weigh scales 10-1, 10-2 . . . 10-N, each of which receives a quantity of product that is preferably a fraction of a target amount. The controls for the machine receive data signals from the scales that represent the amount of product in the respective scales and conduct a search of the scale combinations to establish a combination which, when dumped, forms a charge of product closely approximating the target amount. After the selected scales have been dumped, they are reloaded, the scales are given time to settle, and another combination search is conducted. The machine continues to operate in a cyclic fashion for the purpose of producing a charge of product closely approximating the target amount in each cycle of operation. The term "target amount" as used within this application refers to a quantity of product having a desired weight or piece-count.

The combination weighing machine in the preferred embodiment shown in FIG. 1 utilizes a microprocessor with an internally stored program for carrying out the machine operatioons with the illustrated components and produces commands, such as those required to dump and load the scales. Each cycle of machine operation is initiated through a synchronization or timing signal that is produced either from an internal clock or from an external source, such as an associated packaging machine which receives the charge of product dumped from the scales. In some instances, for example, the associated packaging machine produces "request" or synchronization signals when the packaging machine is prepared to receive the next charge of product from the weighing machine. Alternatively, the weighing machine may set the cyclic speed of operation, and the packaging machine may be slaved to the weighing machine. In either event, the total cycle time or period of operation of the weighing machine is determined by a fixed or variable cyclic rate of operation, and all of the weighing operations, including loading, dumping, and combination searching, must be completed within the allotted time.

To search the loaded weigh scales 10-1 . . . 10-N and find that combination which most nearly approximates the target amount, the data signals from the scales are sampled and transmitted through a multiplexer or other device (not illustrated) to a random access memory 12 of the microprocessor during each machine cycle. The data signals are indicative of the weight or number of products carried by each of the scales and, in addition to the weight information, other data pertaining to the state of the scales is also included. For example, if a particular scale is being calibrated during a given cycle of machine operation, the data signal received in the memory 12 does not accurately reflect a quantity of product to be dumped, and this calibration status of the scale would be indicated by a state signal read and stored in connection with the data signal.

Once the data signals have been read into the memory 12, the data for those quantities which are qualified to be dumped in the event that they are selected as part of a preferred combination of scales is loaded into a Q-table 14 through a data bus 16 by means of the Q-table loader 18. The loader 18 examines the status and value of each scale stored in the memory 12 before the data is loaded into the Q-table 14. For example, if the data signal is less than a predetermined minimal value or a negative value, there is an obvious error, and the value of the data signal for that scale is not loaded in the Q-table. Therefore, at the end of a loading step, only data for those quantities which are qualified to be searched and then dumped is found in the Q-table 14.

With only qualified data loaded in the Q-table 14, the search controller 20 together with a search sequence table 22 performs a search operation on the data of the table. In one embodiment of the invention, a full search sequence is based on a specific order of combinations and is built upon previously listed or searched subcombinations of scales, so that certain combinations or steps in the search sequence can be skipped or omitted to increase the rate at which the combinations are scanned. For example, if a particular combination is composed of a subcombination previously examined during the search operation, and the subcombination itself exceeded the target amount, there is no need to examine the combination or any other combinations which include the subcombination, because it is obvious that the subcombination plus one or more scales cannot approximate the target amount more closely than the subcombination itself. For a more detailed explanation of sampling of the weight signals and such search sequencing, reference may be had to co-pending applications Ser. Nos. 430,354 and 572,661 referenced above.

In the course of a search operation, the weights or amounts represented by the data in the Q-table 14 are added together in various combinations by an arithmetic unit 24. The sums from the various combinations are compared with each other by a comparator 26, and as a result of the comparison, the sums most closely approximating the target weight are stored in a best combinations table 28, which is described in greater detail below. When the search operation is terminated, a preferred combination of scales is determined from the table 28 and the dump controls 30 are actuated so that those scales comprising the preferred combination are dumped and a charge of product closely approximating the target amount, but not less than that amount, is deposited in a package formed in an associated packaging machine. The dumped scales are then reloaded by the loading controls 32, and the cycle of operation is repeated.

In accordance with the present invention, the times allotted for each phase of a machine cycle are controlled by a cycle timing regulator 40. The overall cycle time is determined by an internal clock within the weighing machine or by timing or synchronization signals received by the regulator 40 from the associated packaging machine as mentioned above. The times allotted to each phase of the cycle can be controlled in various manners, but in one embodiment, the time for conducting a combination search is basically preset as part of the stored internal machine program. The time allotted to the search operation is set in accordance with a number of variables, such as the number of scales within the machine, the expected rates of cyclic operation of the machine or its associated packaging machine, and the manner in which the machine operates. As an example of the last factor, some combination weighing machines operate with overlapped machine cycles in which one set of scales is dumped and refilled while a search operation is conducted on the remaining scales.

Figure 2:
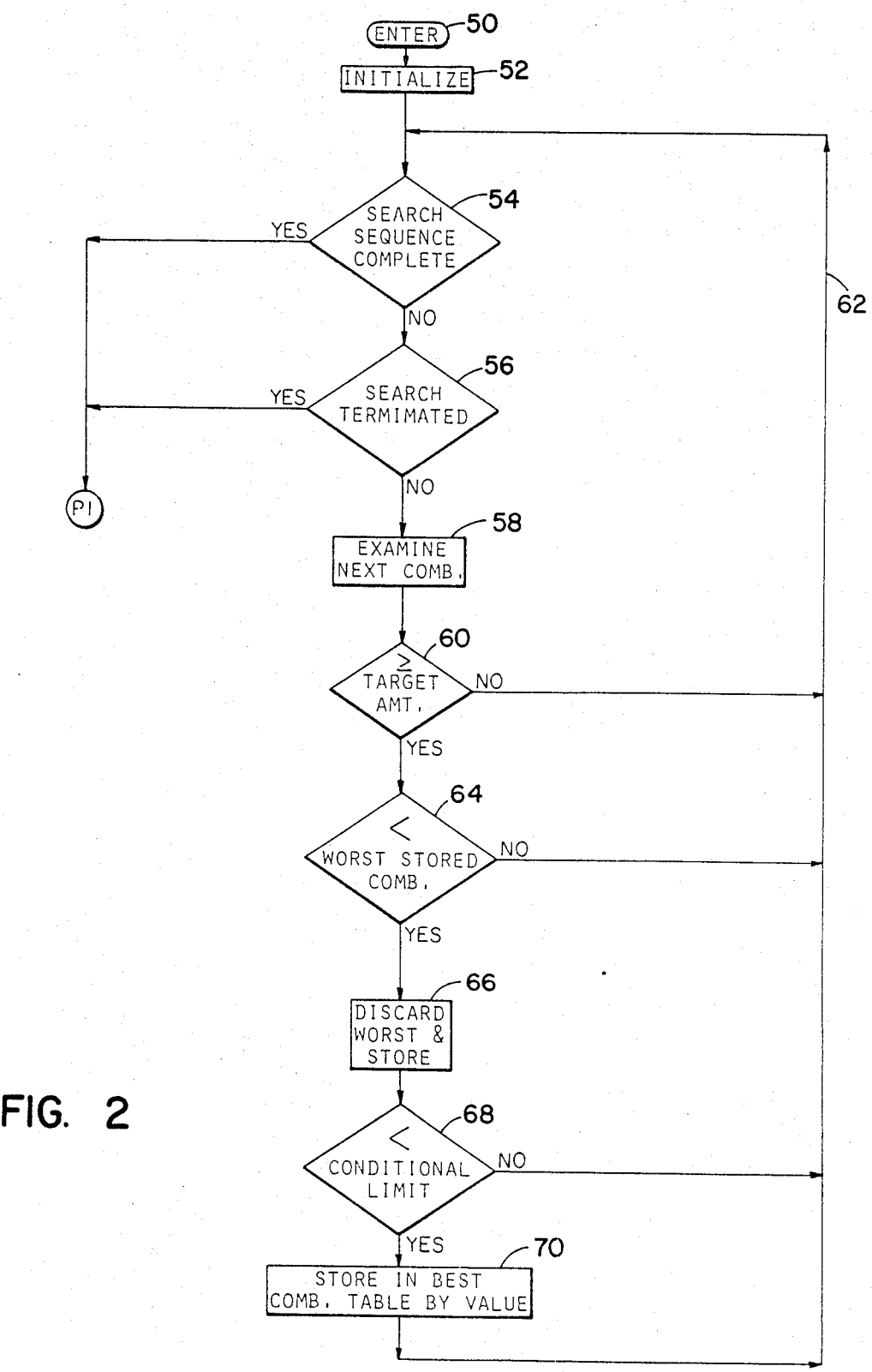
FIG. 2 is a flow chart illustrating the combination search program performed by the combination weighing machine in FIG. 1.

FIG. 2 illustrates in a flow chart a program subroutine for regulating a search operation in one embodiment of the invention. The subroutine is entered at 50 after the weight or number data for the quantities of product in participating scales has been entered in the Q-table 14. At instruction 52, various parameters in the search subroutine are initialized.

The program then advances to branch 54 to determine if the end of the search sequence has been reached by the sequence table 22. Assuming for the purposes of explanation that the search is being initiated or continuing, the program advances to branch 56 and determines if the search has been terminated due to other conditions. For example, the time allotted for the search operation by an internal clock may have expired or the search operation may have been terminated due to external factors, such as a timing or synchronization signal received from the associated packaging machine indicating that the packaging machine is ready to receive another charge of product. Again, assuming that the search is continuing, the program advances to instruction 58 which causes the first or another combination in the search sequence to be examined, that is, be found and added up by the arithmetic unit 24. It should be understood that the next combination after the first or any subsequent combination may actually be several steps removed from the preceding combination in the search sequence if all intervening combinations contain subcombinations greater than the target amount as explained in the referenced co-pending application Ser. No. 430,354.

When the first or other combination is examined, it is also compared at branch 60 against the target amount, and if the combination is less than the target amount, it cannot be used as a dumped combination, and the program returns through the loop 62 to the branch 54, and the search continues. Assuming that the combination compared at instruction 60 is greater than or equal to the target amount, the program advances to branch 64 where the combination is compared with the worst of the best combinations then stored in the best combination table 28. As mentioned above, the best combination table is utilized at each step in the combination search to store the best then-identified combinations which are greater than or equal to the target amount. Since the current combination under consideration at this step of the search sequence is greater than or equal to the target amount, it may be either greater or less than the worst of the stored combinations. If the current combination is greater than the worst stored combination, it is not needed, and the program returns through loop 62 to branch 54. However, if the current combination is less than the worst combination, the then-worst combination is discarded at instruction 66, and the current combination is stored in its place in the combination table 28.

At branch 68, the current combination is compared with a conditional upper limit, such upper limit being set at the target amount plus a tolerance, for example, two percent of the target weight, or some other figure based upon previous performance of the machine, such as two times previous "give-away". The conditional limit is effectively a protective feature that eliminates the process of subsequently sorting through many "best combinations" which ar not very close to the target weight. The best of these not-very-good best combinations is stored at the lowest priority address in the weight table anyway, due to the comparison performed at branch 64 and storing at instruction 66.

If the examination of the current combination at branch 68 indicates that the combination is not less than the conditional limit, then the combination is of no further interest, and the subroutine returns through loop 62 to the branch 54. However, if the combination is less than the conditional limit, then it is stored in the best combination table in accordance with its value as indicated by instruction 70.

The storing process is best understood by reference to an exemplary table shown in FIG. 3. The table shown has four separate addresses for storing four separate best combinations together with additional information that is useful in selecting a preferred combination from the four. The number of combinations stored may be greater or lesser than four depending upon the number of scales that are desired in a final selection process leading to one perferred combination.

The four best combinations are stored in the table 28 in FIG. 3 by value, that is, either by weight or number, and the highest value, representing the worst of the best combinations, is stored at address 4 whereas the lowest, or the best of the best combinations, is stored at address 1. This value sorting is readily performed with the aid of the comparator 26 in FIG. 2. It should be understood, however, that all of the best combinations are equal to or greater than the target amount in view of the processing that occurs at branch 60 in FIG. 2.

In addition to the valve of each combination, the table 28 also includes information pertaining to the total number of scales which comprise each combination, the number of new scales in that combination, and the scales in the combinations themselves. The number of scales is of interest in selecting a preferred combination from the table because each scale includes random error, and in a typical weigh scale operation, the random error for four scales is often as large as the "give-away" due to the combination search. To avoid the formation of charges of product with large errors of this kind, those combinations containing more than the stated number of scales are rejected in a final selection process.

The number of new scales in the combination is also of interest because in general the weight data taken from the scale immediately after it is loaded is less reliable and consequently less accurate than subsequent weighings due to incomplete settling. Thus, a further criterion for the preferred combination is the number of new scales in the combination. Of course, the scales which form the combination are of interest, since that data is needed to dump the preferred combinations.

The process of storing the combinations in accordance with instruction 70 of FIG. 2 requires a comparison of the current combination with each of the weights then stored in the best combination table. Initially, the table is filled with data that is far is excess of the target amount plus the give-away amount, and these fictitious values are replaced as the search produces acceptable combinations.

After a combination has been stored as indicated at instruction 70, the subroutine returns to branch 54 to either terminate or resume the search operation.

Eventually, the search operation is terminated for one of two reasons. Either the program has advanced through to the end of a search sequence and thus the search sequence is complete, or the search is prematurely terminated by the timing regulator 40, due to the expiration of the allotted time. Either one of the conditions leads to the point P1 through the branches 54, 56 respectively. Since the time required to complete the search depends in part on the number of qualified scales participating in the search and the number of steps in the search sequence that are skipped due to qualified subcombinations as mentioned above, it is not possible to predict in any search operation, the exact route to the point P1 through the branches 54 or 56 and correspondingly, whether the search operation through the search sequence will be completed or not.

The fact that a search operation may not be fully complete does not foreclose use of the interim search results in a dumping operation. FIG. 4, for example, shows data derived from a single combination weighing machine utilizing different numbers of scales, and indicates that a ten-scale machine yields give-aways in the order of 1.4 grams after the search operation has been carried out for only 0.025 seconds. At the same time, an 11-scale machine yields 0.57 grams of give-away, and a 13-scale machine yields 0.4 grams of give-away. The graphs further indicate that as the time allowed for searching increases, only incremental improvements occur in the reduction of give-away. Increasing the search time by a factor of 6, for example, reduces the give-away in both the 11- and 13-scale machines by slightly more than 0.3 grams, and this improvement is so insignificant that it is less than the noise effects of the scale measurements.

Two points are established by the data in FIG. 4. The more scales in the search, the less the give-away will be for a given length of search time. Secondly, the total give-away drops with increasing search time, but the absolute value of the drop is so small during the latter 5/6's of a full search that the improvement is not worth waiting until the search is completed. Consequently, partial search results obtained within one-sixth or one-fifth of the full search time are generally acceptable, and since the number of scales participating in the search reduces "give-away", arbitrary limits on the number of scales participating in a search should not be employed to shorten the search times.

After the search is terminated either by branch 54 or 56 in FIG. 2, the program advances to P1, which defines a subroutine for selecting a preferred combination from the best combinations then found in table 28 (FIG. 3). FIG. 5 illustrates one embodiment of that subroutine. When the subroutine is entered, it reads the current address of the best combination at instruction 80. Initially, the current address is set at address 1, which is the best of the best combinations. The program then advances to branch 82 and compares the total number of scales in the best combination against a selected limit of four scales. In the example shown in FIG. 3, the combination at address 1 has exactly four scales, and therefore, this combination would be rejected as a best combination because there are too many scales, and consequently, the possibility of too much cumulative error in the total amount of product indicated in the combination. The subroutine thus branches through loop 84 to instruction 86 where the current address is increased by one to 2. The program passes through branch 88, and because the address is not equal to 5, it returns to instruction 80 where the data pertaining to the combination at address 2 is read from the best combination table.

In the next step of the program through branch 82, the combination at address 2 being comprised of only three scales would take the program to branch 90 where the number of new scales is compared against the selected number of three scales, and since there are only two new scales in the second combination, the program would accept the combination as the preferred combination and cause that combination of scales to be dumped in accordance with instruction 92. The program would then be exited at 94 and proceed to the next cycle of operation.

However, if the number of new scales in combination No. 2 were three or more, the program would reject the combination and advance through loop 84 back to the instruction 86. Repeated cycles through the subroutine in FIG. 5 would continue for the combinations at addresses three and four, because the number of total scales in each of the remaining listed combinations is not less than 4, as required at branch 82. After examining the combination at address No. 4, instruction 86 increases the current address to five, and branch 88 then causes the weighing machine to miss a dump operation in view of instruction 96. Under such circumstances, none of the scales is dumped because they are not considered suitable under the criteria established for the preferred combination, and the program subroutine is exited at 98.

Certain remedial steps to prevent the combination weighing machine from missing the dump in the next cycle of operation can be taken, such as reloading incremental amounts of product into one or more of the already loaded scales, or the addition of new scales that were not previously loaded may take the machine out of its stagnated condition. Failing any remedy, the machine may be programmed to stop and produce a signal indicating its difficulty.

In summary, a combination weighing machine has been disclosed which operates at higher speed due to restrictions that are imposed in the time to perform search operations. The searches are terminated whether they are completed or not without significantly affecting the results adversely. Multiple combinations are reviewed at the end of a search operation, and a preferred combination is selected based upon criteria other than those utilized during the search.

While the present invention has been described in a preferred embodiment, it should be understood that numerous modifications and substitutions can be had without departing from the spirit of the invention. For example, the invention may be employed in a variety of combination weighing machines having different numbers of scales. The foreshortening of the search operations must necessarily permit at least a minimal amount of searching to be performed, as indicated by the approximately exponential decay of the results shown in the graphs of FIG. 4. The number values employed in selecting a preferred combination and the time periods mentioned in the specification are provided simply as examples. The invention has utility in combination weighing machines which search for either a preferred weight or number of products, and has particular utility in those combination weighing machines wherein the number of scales participating in the search and the number of steps in the search sequence are not fixed. The invention is disclosed as a microprocessor-based design; however, other forms of the invention, including wired, microcircuit, fluidic, and similar control systems are feasible. Accordingly, the present invention is defined in a preferred embodiment by way illustration rather than limitation.

We claim:

1. A combination weighing machine for forming a charge of product closely approximating a target amount in a cyclic machine operation comprising:

a plurality of weigh scales, each receiving a quantity of product in an amount preferably a fraction of the target amount and providing a data signal indicative of the quantity of product received;

arithmetic means for receiving the data signals from the scales in various combinations and combining the signals to produce total sums indicative of the total quantity of product in each respective combination;

combination searching means for supplying the data signals to the arithmetic means is selected combinations in a search sequence during a combination search operation;

comparator means for determining in the course of a search operation which of the combinations of scales have total sums most nearly approximating the target amount;

memory means for storing the searched combination most nearly approximating the target amount during the course of the search operation;

means for terminating the search operation of the combination searching means upon a specified condition whether the search sequence is completed or not; and utilization means for receiving from the memory means the preferred combination at the termination of a search operation.

2. A combination weighing machine for forming a charge of product as defined in claim 1 wherein the means for terminating the search operation is set to start and stop a search operation in a time period less than that required to conduct a full search of all combinations of scales in the machine.

3. A combination weighing machine for forming a charge of product as defined in claim 1 wherein the combination searching means includes means for excluding from the selected combinations of scales supplied to the arithmetic means in the search sequence scale combinations having subcombinations exceeding the target amount.

4. A combination weighing machine for forming a charge of product as defined in claim 1 wherein:

the combination searching means includes a table for temporarily storing in each search operation data defining the quantity of product in those scales qualified to be used by the utilization means; and search control means for performing the combination search only on the data of the qualified scales in the table.

5. A combination weighing machine for forming a charge of product as defined in claim 1 wherein the means for terminating the search operation upon a specified condition is responsive to a timing signal.

6. A combination weighing machine as defined in claim 5 wherein the means for terminating is set to terminate the searching operation in less time than required to search all combinations of the scales in the machine.

7. A combination weighing machine for forming a charge of product as defined in claim 1 wherein:

the memory means stores more than one searched combination closely approximating the target amount; and further including means for selecting among the stored combinations for use by the utilization means a preferred combination based upon criteria other than that employed in storing the searched combinations.

8. A combination weighing machine as defined in claim 7 wherein the means for selecting employs criteria selected from the group consisting of the number of scales composing the stored combinations and the number of new scales composing the stored combinations.

9. In a method of operating a combination weighing machine to form a charge of product closely apprximating a target amount, the machine having a plurality of weigh scales, each receiving and measuring a quantity of product and providing a data signal representing the amount of product in the scale, the data signals being employed in a search operation through a sequence of scale combinations to identify a preferred combination for forming the charge of product in each cycle of machine operation, the improvement comprising the steps of:
  terminating the search operation upon the occurrence of a specified condition whether the search through the sequence of scale combinations has been completed or not; and
  utilizing the preferred scale combination found at the time of termination of the search operation to form the charge of product closely approximating a target amount.

10. In a method of operating a combination weighing machine, the improvement of claim 9 further including
  varying the number of scales in the plurality which participate in the search operations of different cycles of machine operation whereby the length of time required to search through the seqences of scale combinations also varies.

11. The improvement of claim 10 including
  qualifying the weigh scales in each cycle of operation against presecribed operating conditions; and
  the step of varying comprises varying the number of scales which participate by eliminating unqualified scales from the sequence of scale combinations searched.

12. The improvement of claim 11 wherein one of the prescribed operating conditions is a data signal not less than a predetermined amount.

13. In a method of operating a combination weighing machine, the improvement of claim 9 including the step of excluding from the sequence of searched combinations as the search operation progresses, the combinations having subcombinations equal to and exceeding the target amount, whereby the length of time required to search through the sequence varies from cycle to cycle.

14. In a method of operating a combination weighing machine, the improvement of claim 9 wherein the step of terminating comprises:
  establishing a period of time to carry out a search through the sequence of scale combinations within a machine cycle, the period of time being less than that necessary for searching through the full sequence of combinations for all of the plurality of weigh scales; and
  allowing the number of scales included in the sequence of combinations searched to vary from one cycle of machine operation to the next whereby the established period of time may or may not be of sufficient duration to accommodate a complete sequence search before the period of time expires.

15. In a method of operating a combination weighing machine, the improvement of claim 9 wherein the step of terminating comprises:
  establishing a period of time to carry out a search through the sequence of scale combinations within a machine cycle, the period of time being less than that necessary for searching through the full sequence of combinations for all of the plurality of weigh scales; and
  allowing combinations having previously searched subcombinations equal to or exceeding the target amount to be skipped in the sequence of scale combinations searched whereby the established period of time may or may not be of sufficient duration to accommodate a complete sequence search before the period of time expires.

16. In a method of operating a combination weighing machine, the improvement of claim 9 wherein further steps include:
  establishing and storing a limited number of best combinations searched during the course of a search operation; and
  selecting the preferred scale combination for the step of utilizing from the stored combinations at termination based upon criteria not employed in the step of establishing the best combinations.

17. The improvement of claim 16 wherein said criteria include the total number of scales in the combinations.

18. The improvement of claim 16 wherein said criteria include the number of new scales in the combinations.

* * * * *